Aug. 1, 1967   J. E. KIRKPATRICK   3,333,526
COMBINATION FOOD COOKER AND SMOKER
Filed April 26, 1965   2 Sheets-Sheet 1
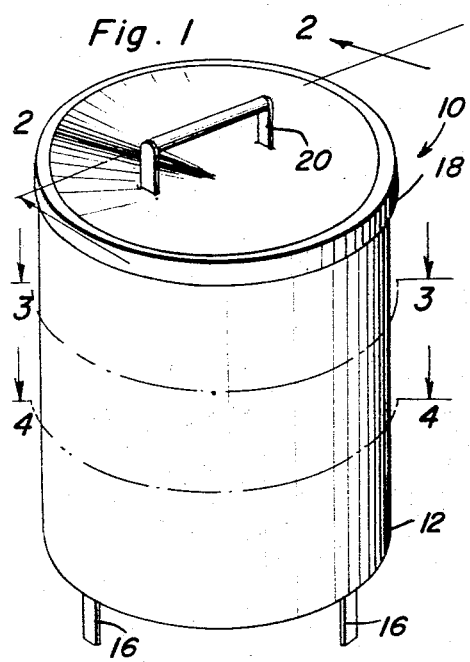
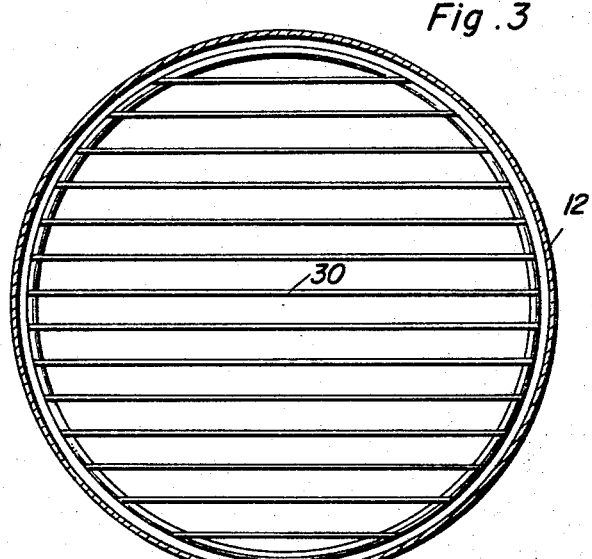
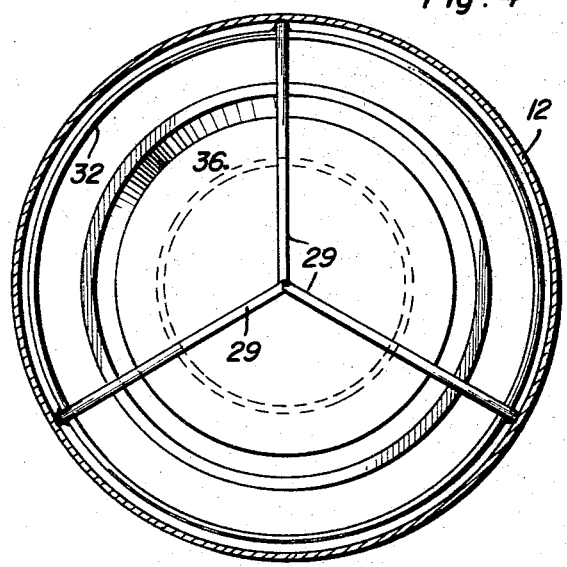
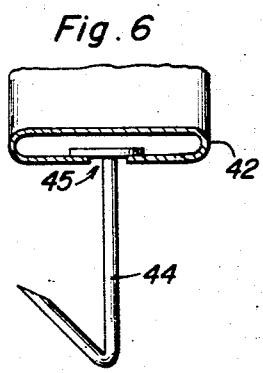
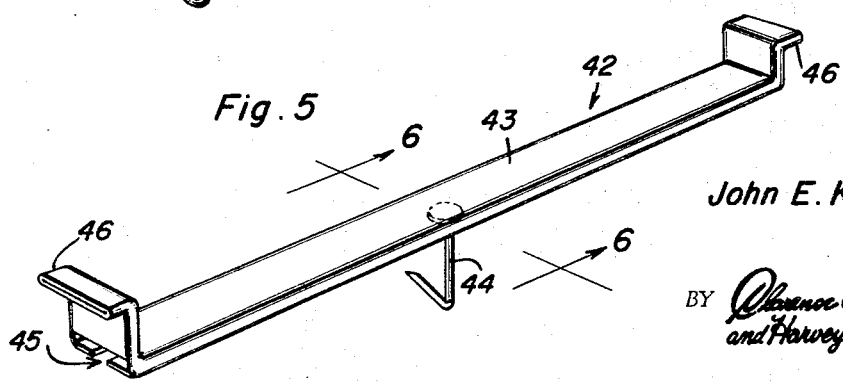
John E. Kirkpatrick
INVENTOR.

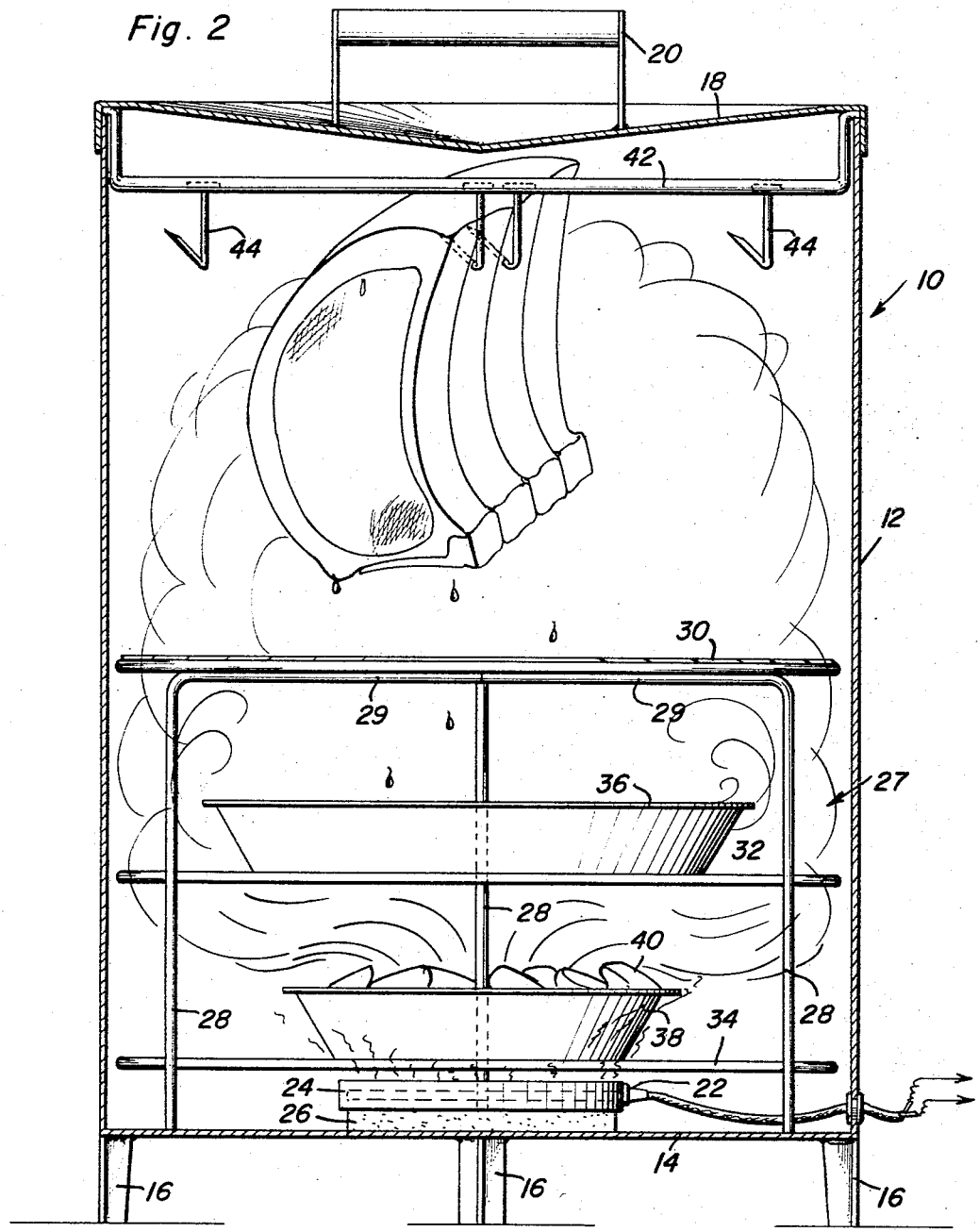

United States Patent Office 3,333,526
Patented Aug. 1, 1967

3,333,526
COMBINATION FOOD COOKER AND SMOKER
John E. Kirkpatrick, 5335 Laurel Creek Way,
Houston, Tex. 77017
Filed Apr. 26, 1965, Ser. No. 450,673
2 Claims. (Cl. 99—260)

This invention relates to a portable cooking device and more particularly to a combination food cooker and smoker which may be used indoors as well as outdoors.

Various cookers of this nature have been proposed heretofore however for the most part they have been characterized by undesirable features particularly with regard to the structure utilized for the generation of smoke to aid in flavoring the food being cooked. In addition, these prior art devices either require the use of charcoal to provide the heat and smoldering wood chip to provide the smoke or they are electrically heated and depend upon the burning of dropping fat to produce the smoke.

It is an object of this invention to provide a combination food cooker and smoker which utilizes an electrical resistance heating element and is designed so as to provide an atmosphere for cooking and smoking food which does not tend to abnormally dehydrate the food being cooked.

Another object of this invention is to provide a combination cooker and smoker which is constructed in such a manner so as to be readily adaptable to cook and smoke food of varying characteristics.

A further object of the present invention is to provide a cooker of the character described which requires a relatively small amount of wood to generate the required smoke therefore permitting operation of the cooker for extended periods without the necessity of having to replenish the supply of smoke generating material.

Still another object of the present invention is to provide a cooker which is provided with means to return a substantial portion of the moisture driven out from the food being cooked to the food to prevent unnecessary dehydration of the food.

Still a further object of the present invention is to provide a combination cooker and smoker which in the course of heating and smoking the food placed therein subjects the food to generally constant conditions thereabout without subjecting the portion of the food closest to the source of heat to any disproportionate amount of radiation which might unnecessarily dehydrate the portion of the food facing the source of heat.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a perspective view of the combination cooker embodying the present invention;

FIGURE 2 is an enlarged vertical sectional view of the present device taken substantially along the plane of the line 2—2 of FIGURE 1, with the internal elements of the device shown substantially in side elevation.

FIGURE 3 is an enlarged horizontal sectional view taken substantially along the plane of the line 3—3 of FIGURE 1;

FIGURE 4 is an enlarged horizontal sectional view taken substantially along the plane of the line 4—4 of FIGURE 1;

FIGURE 5 is a perspective view of one embodiment of the food supporting means utilized in the present device; and FIGURE 6 is an enlarged vertical transverse sectional view taken substantially along the plane of the line 6—6 of FIGURE 5.

Referring now to the drawings in detail, a combination food cooker and smoker is indicated generally at 10, which includes a generally cylindrical open top container 12 having a substantially flat bottom wall 14. The cooker 10 is preferably provided with a plurality of legs 16 which maintain a bottom wall 14 in spaced-apart relation from the supporting surface to preclude dangerous overheating of the support surface.

The cooker and smoker 10 is further provided with a lid 18 which is characterized by a downwardly and inwardly projecting conical concave configuration, for reasons which will be described in detail. The lid 18 is telescopically positioned on the container 12 and frictionally retained thereon. The lid 18 fits in such a manner to substantially preclude the escape of smoke or moisture from the cooker 10. It will be understood however, that the manner in which the lid 18 fits on the container 12 permits an equilization between the internal and external pressures to prevent a pressure differential which would bring about an explosion or an implosion of the lid 18. The lid 18 is further provided with a handle 20 which is secured to the lid 18 by means of welding, riveting or the like.

The cooker 10 is provided with a heat source indicated generally at 22, which includes an electrical resistant heating element 24 which is preferably maintained in spaced apart relationship from the bottom wall 14 by means of a non-combustible insulating member 26. The heating element 24 and the insulating member 26 are secured to the bottom 14 by means of bolts, rivets or the like (not shown).

The dimensions of and the heat radiation, or heat loss from the cooker and smoker 10 determines the wattage required for the resistance heating element. The heating element wattage is preferably selected so as to provide an average cooking temperature of about 325° F. Although not shown, it will be understood that the heat source 22 may be adjusted by means of a rheostat switch interposed in the conductor between the source of line current and the electrical resistance heating element 24. The cooker and smoker 10 is further provided with a rack indicated generally at 27, which preferably includes a plurality of legs 28 formed of stainless steel, chromeplated wire, or the like, which are provided with outwardly projecting portions 29 integrally secured centrally of the interior to provide a planar surface for the support of a grilling rack 30.

The grill rack 30 may be secured to the planar surface defined by the portion 29 of the legs 28 by means of tack welding or it may just rest thereon. The rack 27 is further provided with a pair of pan support racks 32 and 34 which are preferably formed of wire and secured to the rack legs 28 by tack welding, or the like, in spaced apart relation from the heat source 22 and the grilling rack 30. The rack 32 provides a means of supporting a drip catching tray 36 and the rack 34 provides a means for supporting a pan 38 which is utilized to hold the wood chips, or saw dust, utilized to generate a dense smoke which flavors the food being cooked. The wood chips 40 are preferably of a wood species such as hickory, oak or pecan, for example and in normal use the pan 38 provided with several ounces of hardwood chip will emit smoke for about three to four hours, which for all practical purposes eliminates the necessity of opening the cooker 10 during the course of cooking to add more wood chips.

The rack 27 is removable for cleaning and placement of the pans 36 and 38 thereon.

The cooker 10 in addition to the grilling rack 30 which may be utilized for relatively thin cuts of meat such as steak or chops, for example, is further provided with a hanging rack 42, which is formed of a channel member 43 which defines a trackway 45 to slidably support one or more food impaling support hooks 44. The ends of the hanging rack 42 terminate in upwardly and outwardly deformed portions indicated at 46 which in operation are supported by the upper edge of the cylindrical container 12. The trackway 43 is supported at a sufficient distance below the top edge thereof so as to not interfere with the inwardly projecting conical portion of the lid 18.

The utilization of the cooker 10 would be as follows:

The rack 27 with the empty pan 36 and the pan 38 containing the wood chips 40 would be placed within the cooker 10 through the open top of the container 12 and as shown in FIGURE 2. The rack 42 with a portion of meat impaled on one or more of the hooks 44 would be hung from the top edge of the container 12 with the meat preferably positioned centrally of the container 12. The lid 18 would then be placed over the end of the container 12. The electrical resistance heating element 24 would be energized thereby heating up the interior of the cooker 10 and at the same time heating the pan 38 containing the wood chips 40 to the point where the wood smolders without an open flame to produce a dense smoke. The pan 36 is interposed between the food being cooked and the pan 38 containing the wood chips 40 to preclude dampening of the wood chip 40 by fat, or natural juices dripping from the food being cooked, whether it be supported by the hanging rack 42 or the grilling rack 30.

The size of the pan 38 and the heating element 24 are preferably chosen so that the pan 38 is at least as large in diameter as the heating element so as to preclude any direct radiation from the heating element to the food being cooked thereby precluding localized or spot heating of the food. Accordingly, it may be seen that the food will be subjected to a substantially uniform temperature over its entire surface.

Free moisture or fatty oil vapors condensing on the underside of the lid 18 will flow toward the downwardly projecting apex of the conical portion of the lid 18 and drip back onto the food being cooked thereby basting the food to preclude any abnormal drying out of the food being cooked.

It may therefore be seen that very little of the natural juices of the food being cooked can escape from within the cooker. This moisture mixes with the smoke and helps to provide a moist heat which more readily penetrates the food being cooked while preventing the undue dehydration of the food being cooked.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. In combination a cooking and smoking device comprising a cylindrical substantially imperforate combustion draft air excluding container having an open top, a removable imperforate lid normally closing said open top whereby the interior of said container does not receive sufficient air to support open combustion, a bottom wall on said container, a source of heat secured to said bottom wall inwardly of said container, a plurality of upstanding legs secured to said bottom wall, said legs being adapted to maintain said bottom wall in spaced apart relation from a surface supporting said cooking and smoking device, bottom supported standing rack means adapted to support smoke generating material adjacent and upwardly of said heat source, said heat source being adapted in the absence of draft air to cause the smoke generating material to smolder without an open flame, means adapted to support a drip catching pan adjacent and upwardly of said smoke generating material, and hanging rack means carried by the upper edge of said container adjacent said open top and inwardly thereof, said hanging rack being provided with food impaling support means to support food being cooked and smoked.

2. In combination a cooking and smoking device comprising a substantially cylindrical draft air excluding imperforate container having an open top, a removable imperforate lid normally closing said open top, said lid having an inwardly projecting conical configuration, a bottom wall on said container, an electrical resistance heating element secured to said bottom wall inwardly of said container, a plurality of of upstanding legs secured to said bottom wall, said legs being adapted to maintain said bottom wall in spaced apart relation from a surface supporting said cooking and smoking device, a removable standing rack positioned within said container, said rack being supported by said bottom wall of said container and extending upwardly therefrom, said rack being adapted to support a receptacle containing a smoke generating material adjacent and above said source of heat, said rack also being adapted to support a drip pan adjacent and above said smoke generating material, said rack being further provided with a means of supporting food adjacent to and above said drip pan, hanging rack means supported by the upper edge of said container, and food impaling support hook means carried by said hanging rack means whereby food may be supported within and removed from said container without necessitating removal of said standing rack.

References Cited

UNITED STATES PATENTS

| | | | |
|---|---|---|---|
| 446,033 | 2/1891 | Stillman | 99—347 |
| 926,163 | 6/1909 | Bauer | 99—347 |
| 1,219,200 | 3/1917 | Truitt | 99—347 |
| 2,842,043 | 7/1958 | Reuland | 99—259 |
| 3,096,706 | 7/1963 | Cardwell | 99—259 |

WALTER A. SCHEEL, *Primary Examiner.*

ROBERT W. JENKINS, *Examiner.*